C. S. PRICE.
SHELL FISH SCRAPER.
APPLICATION FILED JUNE 2, 1920.
1,380,247.
Patented May 31, 1921.
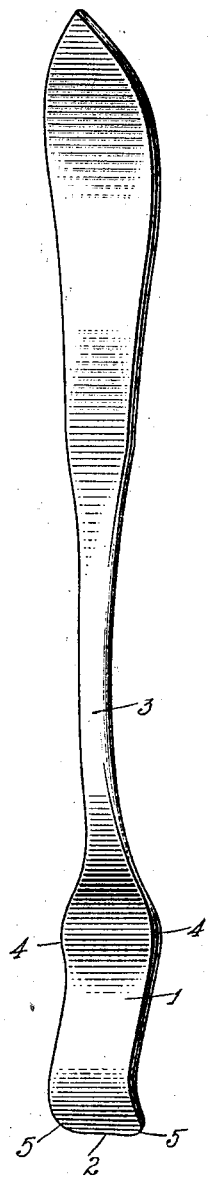
WITNESSES
INVENTOR
Charles S. Price.
BY
ATTORNEYS

UNITED STATES PATENT OFFICE.

CHARLES S. PRICE, OF DENVER, COLORADO.

SHELL-FISH SCRAPER.

1,380,247.　　　　Specification of Letters Patent.　　Patented May 31, 1921.

Application filed June 2, 1920. Serial No. 386,021.

*To all whom it may concern:*

Be it known that I, CHARLES S. PRICE, a citizen of the United States, and a resident of Denver, in the county of Denver and State of Colorado, have invented a new and Improved Shell-Fish Scraper, of which the following is a full, clear, and exact description.

This invention relates to improvements in shellfish scrapers, and more particularly to an article for table use which is designed to take the place of the so-called "oyster fork" and which can be conveniently utilized in connection with lobsters, shellfish, and the like, to loosen or free the meat from the shell and to carry the same onto the service plate.

A further object is to provide an article for table use which will form a part of the silverware or table service, which will be neat and attractive in appearance, and which will efficiently perform the functions for which it is intended.

With these and other objects in view the invention consists in certain novel features of construction, and combinations and arrangements of parts, as will be more fully hereinafter described and pointed out in the claims.

The accompanying drawing is a perspective view illustrating my improved scraper.

1 represents the body of my improved scraper which is composed of silver or any other suitable material, which is relatively narrow in its transverse dimension, and which has a general compound curvature longitudinally and provided at one end with an integral handle 3 of any desired ornamental design.

The extreme end or edge 2 of the scraper may be as sharp as desired, so as to freely cut the meat from the shell and by reason of the curvature or bend in the body, the latter can be conveniently manipulated to free the meat from difficult angles or places in the shell of lobsters and other form of shellfish.

The body portion 1 adjacent its point of connection with the handle 3 is preferably extended transversely so that its edges are curved outwardly in a slight convex curve, as indicated at 4, thus providing an extended spoon-like receptacle in which the meat can be conveniently carried onto the service plate.

The side edges of the body portion 1 at the extreme edge 2 are preferably rounded, as shown at 5, so as to prevent scratching or cutting the shell and also to conform somewhat to the general curvature of the shell during the cutting or scraping action.

With my improved device oysters can be readily freed from their shells and carried to the plate and also the tool can be conveniently used for cleaning the meat from the shells of lobsters and other like shellfish.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. In a device of the character stated, a handle, a body portion of compound curvature longitudinally, and of substantially the same width throughout, the free end of said body portion located transversely to the plane of the handle and terminating in a sharp scraping edge located transversely of the longitudinal axis of the handle.

2. A device of the character stated including a handle, a body portion of compound curvature longitudinally, the free end of said body portion curved to form a hoe and terminating in a relatively sharp straight scraping edge located transversely of the longitudinal axis of the handle.

CHARLES S. PRICE.